United States Patent [19]

Masaki et al.

[11] Patent Number: 4,672,547
[45] Date of Patent: Jun. 9, 1987

[54] ANTISKID CONTROL WITH SURFACE ROUGHNESS COMPENSATION

[75] Inventors: Shouichi Masaki; Kimio Tamura, both of Anjo; Noriyuki Nakashima, Nagoya; Teruyoshi Wakao, Nagoya; Ken Asami, Nagoya; Kazunori Sakai, Nagoya, all of Japan

[73] Assignees: Nippondenso Co., Ltd., Kariya; Toyota Jidosha Kabushiki Kaisha, Toyota, both of Japan

[21] Appl. No.: 632,524

[22] Filed: Jul. 19, 1984

[30] Foreign Application Priority Data

Jul. 19, 1983 [JP] Japan .................................. 58-131459

[51] Int. Cl.[4] ............................................... B60T 8/34
[52] U.S. Cl. ....................................... 364/426; 303/97; 303/103; 73/105
[58] Field of Search ..................... 364/426, 565, 566; 180/197; 361/238; 73/105; 303/95, 97, 103

[56] References Cited

U.S. PATENT DOCUMENTS 4,395,761  7/1983  Sato et al. ............................ 364/426
4,408,290 10/1983  Kubo et al. .......................... 364/566
4,422,322 12/1983  Spangler .............................. 73/105
4,499,543  2/1985  Matsuda .............................. 364/426
4,573,131  2/1986  Corbin ................................ 364/566

Primary Examiner—Gary Chin
Attorney, Agent, or Firm—Cushman, Darby & Cushman

[57] ABSTRACT

In an antiskid control system, the acceleration of a vehicle wheel is detected and compared with a predetermined value. A first count value is incremented in response to the detection of the wheel acceleration exceeding the predetermined value. When this first count value exceeds a reference count within a first preset period, the road is interpreted as having a rough surface and a second count value is similarly incremented in response to the detection of the wheel acceleration exceeding the predetermined count. If the second count value does not reach the reference count within a second preset period longer than the first preset period, the road is interpreted as having a smooth surface. The gradient of brake hydraulic pressure of the vehicle is controlled in response to the different interpretation of the road surface.

9 Claims, 19 Drawing Figures

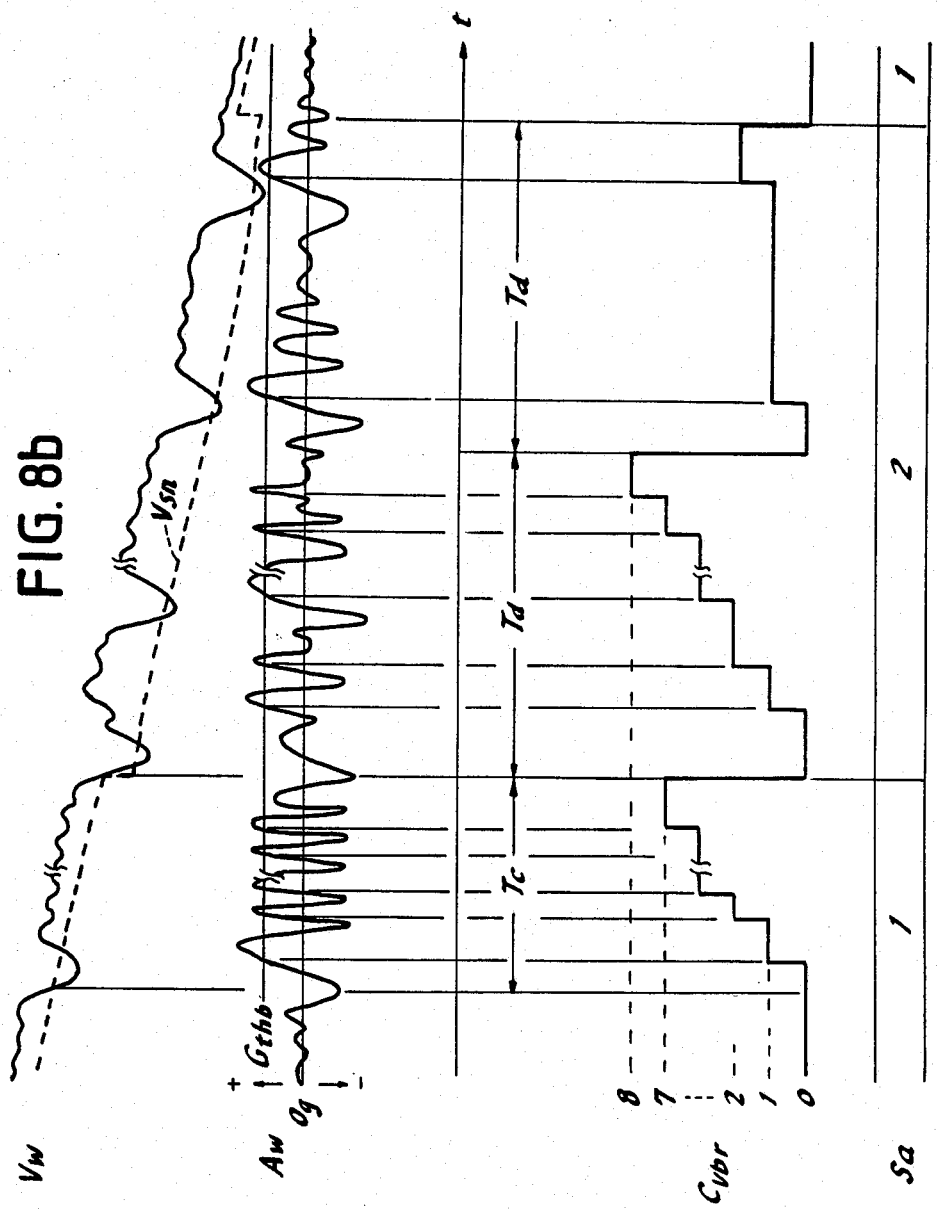

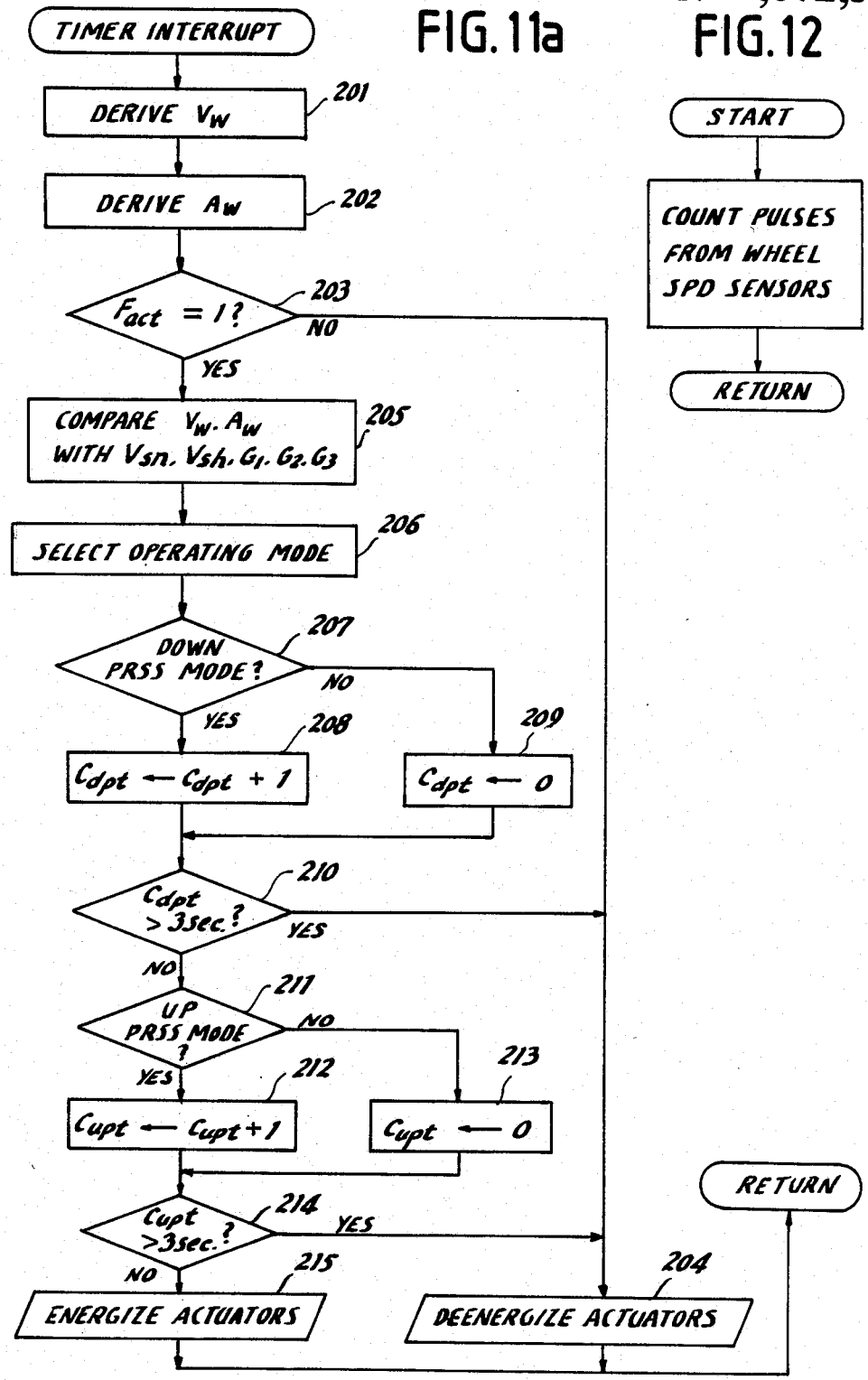

STEP 205

FIG.13

| MODE | $f_{VSN}$ | $f_{VSH}$ | $f_{G3}$ | $f_{G2}$ | $f_{G1}$ | PRESSURE GRADIENT |
|---|---|---|---|---|---|---|
| I | 0 | 0 | 0 | 0 | 0 | |
| II | 0 | 0 | 0 | 0 | 1 | ↙ |
| III | 0 | 0 | 0 | 1 | 1 | ↙ |
| IV | 0 | 0 | 1 | 1 | 1 | ↗ |
| V | 1 | 0 | 0 | 0 | 0 | ↖ |
| VI | 1 | 0 | 0 | 0 | 1 | ↙ |
| VII | 1 | 0 | 0 | 1 | 1 | ↖ |
| VIII | 1 | 0 | 1 | 1 | 1 | ↖ |
| IX | 1 | 1 | 0 | 0 | 0 | ↗ |
| X | 1 | 1 | 0 | 0 | 1 | ↖ |
| XI | 1 | 1 | 0 | 1 | 1 | ↗ |
| XII | 1 | 1 | 1 | 1 | 1 | ↖ |

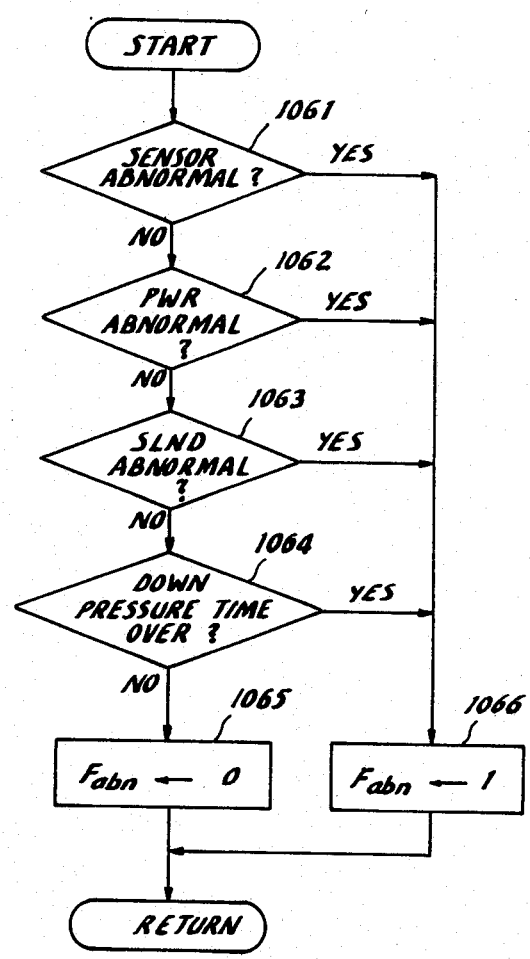

ANTISKID CONTROL WITH SURFACE ROUGHNESS COMPENSATION

BACKGROUND OF THE INVENTION

The present invention relates to an antiskid control system.

Antiskid control systems known in the art are proved unsatisfactory for operation under all kinds of road surface conditions. In particular, conventional antiskid control systems do not function properly when running on rough surface roads.

SUMMARY OF THE INVENTION

Accordingly, the present invention provides an antiskid control system which is capable of detecting the surface roughness of a road for appropriately controlling the hydraulic pressure.

According to the invention, the acceleration of a vehicle wheel is detected and compared with a predetermined value. A first count value is incremented in response to the detection of the wheel acceleration exceeding the predetermined value. When this first count value exceeds a reference value within a first preset period, the road is interpreted as having a rough surface and a second count value is similarly incremented in response to the detection of the wheel acceleration exceeding said predetermined value. When the second count value does not reach the reference value within a second preset period longer than the first preset period, the road is interpreted as having a smooth surface. The gradient of brake hydraulic pressure of the vehicle is controlled in response to the different interpretation of the road surface.

BRIEF DESCRIPTION OF THE DRAWINGS

The present invention will be described in further detail with reference to the accompanying drawings, in which:

FIGS. 11a and 11b are illustrations of a flow diagram describing a timer interrupt subroutine;

FIG. 12 is a flow diagram of an interrupt subroutine in which vehicle speed pulses are counted;

FIG. 13 is an illustration of actuator operating modes;

FIG. 15 is a flow diagram describing a system check subroutine of FIG. 5.

DETAILED DESCRIPTION

Figure 1:
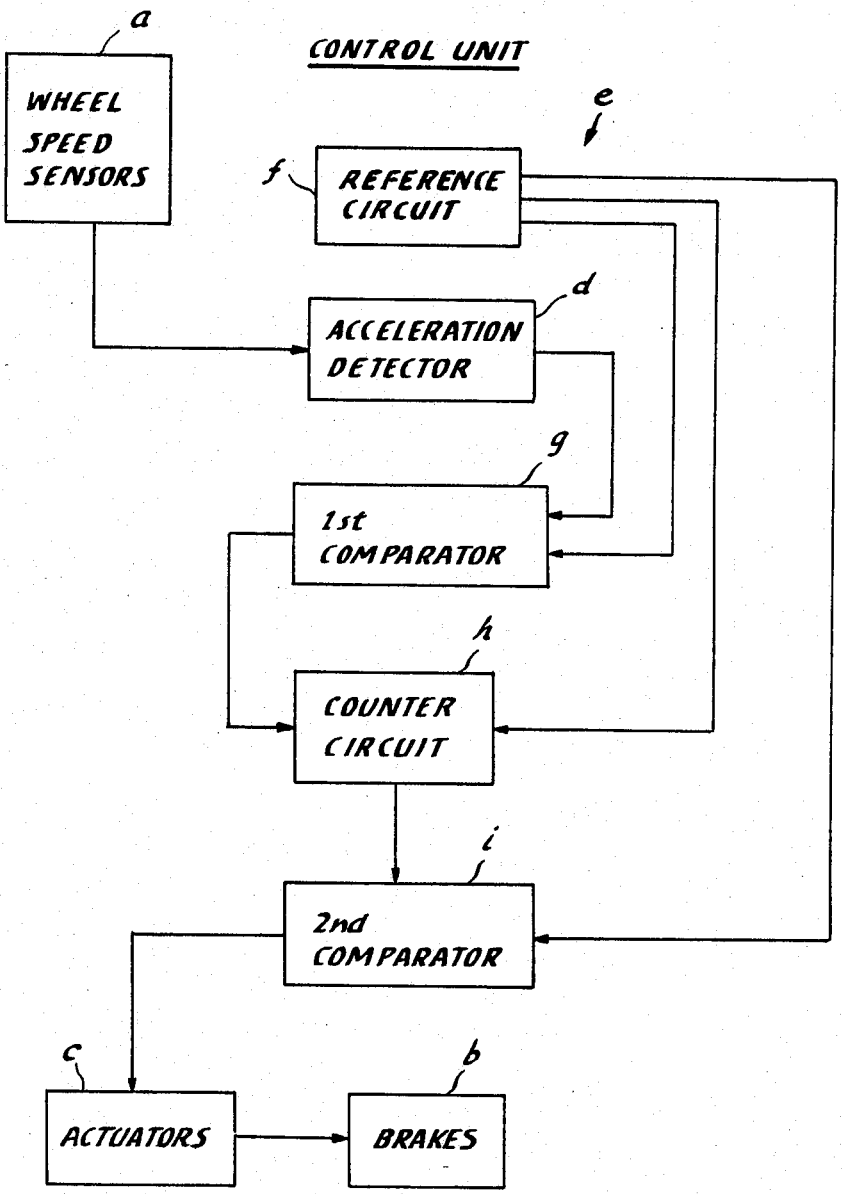
FIG. 1 is a schematic illustration of an antiskid control system embodying the invention.

The antiskid control system of the present invention represented in FIG. 1 comprises generally a plurality of wheel speed sensors a, a control unit e having an acceleration detector d coupled to the sensors a, a reference circuit or a memory f providing reference signals, first and second comparators g and i and a counter circuit h. The reference signals stored in memory f include an acceleration threshold against which the output of acceleration detector d is compared, data representing first and second periods during which the comparison is to be made and a reference count representing a predetermined road surface condition. The first comparator g compares the output of acceleration detector d with the acceleration threshold in said periods in succession. The counter h increments a count value when the threshold is exceeded during said periods. The second comparator i compares the output of counter h with the reference count to detect whether the count values in the first and second periods exceed or remain below the reference count and controls brake pressure actuators c associated with brakes b according to the results of the comparison.

Figure 2:
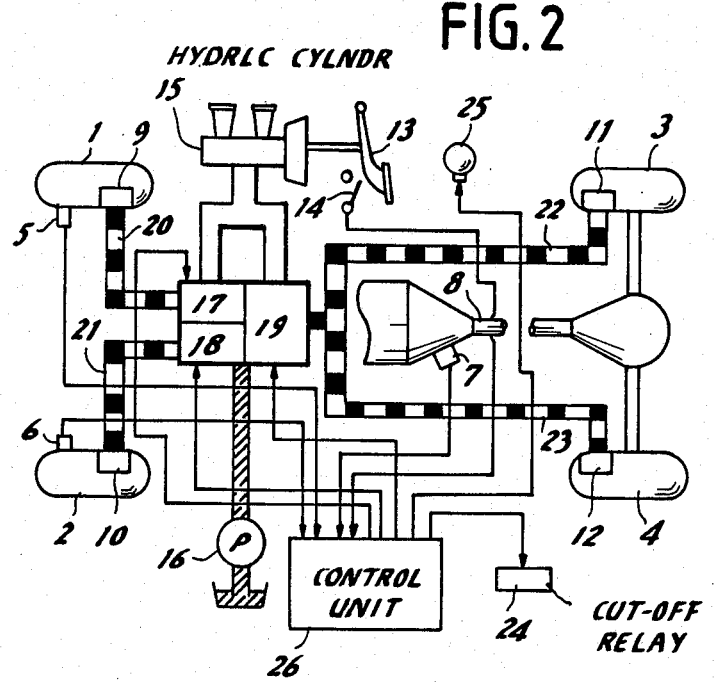
FIG. 2 is an illustration of the mechanism of the antiskid control system.

FIG. 2 shows a general structure of the antiskid system of the invention incorporated in a rear drive vehicle. Wheel speed sensors 5 and 6 on front-right and front-left wheels 1 and 2 provide front wheel speed signals independently to a control unit 26, and a rear wheel speed sensor 7 is located on a propeller shaft 8 that drives rear-right and rear-left wheels 3 and 4 to provide an average rear wheel speed to the control unit. Pressure control signals are supplied from control unit 26 to solenoid-operated actuators 17, 18, 19 which in turn control pressures of hydraulic brakes 9, 10, 11, 12 mounted on wheels 1, 2, 3, 4 through lines 20, 21, 22, 23, respectively. Brake-pedal ON or OFF signal is fed from stop switch 14 located in proximity to brake pedal 13 to control unit 26. A hydraulic cylinder 15 provides a brake pressure to actuators 17–19 in response to brake pedal 13 being depressed. Solenoid actuators 17–19 are supplied with a constant hydraulic pressure from a pump 16. Control signals are supplied to the actuators 17–19 through a fail-safe cut-off relay 24 from control unit 26. A warning light 25 is provided to alert vehicle passengers when disconnection have occurred in the circuits to the solenoid actuators and stop switch 14.

Figure 3:
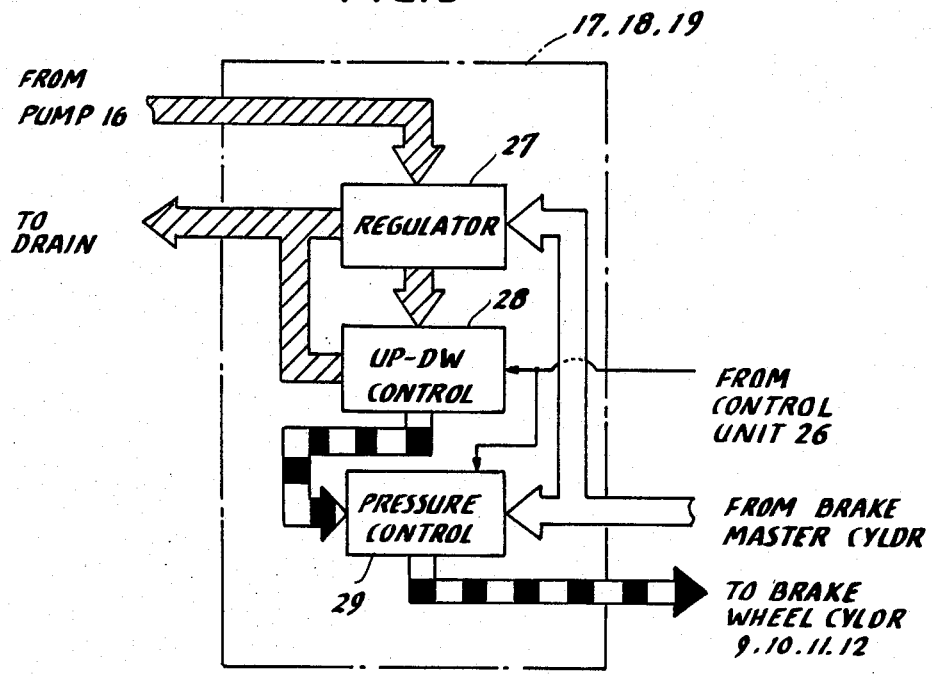
FIG. 3 is an illustration of the detail of the actuators of FIG. 2.

As illustrated in FIG. 3, each of solenoid actuators 17–19 comprises a pressure regulator 27 which is connected to pump 16 to regulate the hydraulic pressure at a constant level. A control valve unit 28 includes a switching solenoid which provides brake pressure up-down control and a pressure control solenoid that controls the gradient of pressure applied to brakes. Further provided is a brake pressure controller 29 including a switching solenoid that provides high pressure variation when energized and low pressure variation when de-energized. The output of controller 29 is connected to the brake wheel cylinder of the associated brake.

Figure 4:
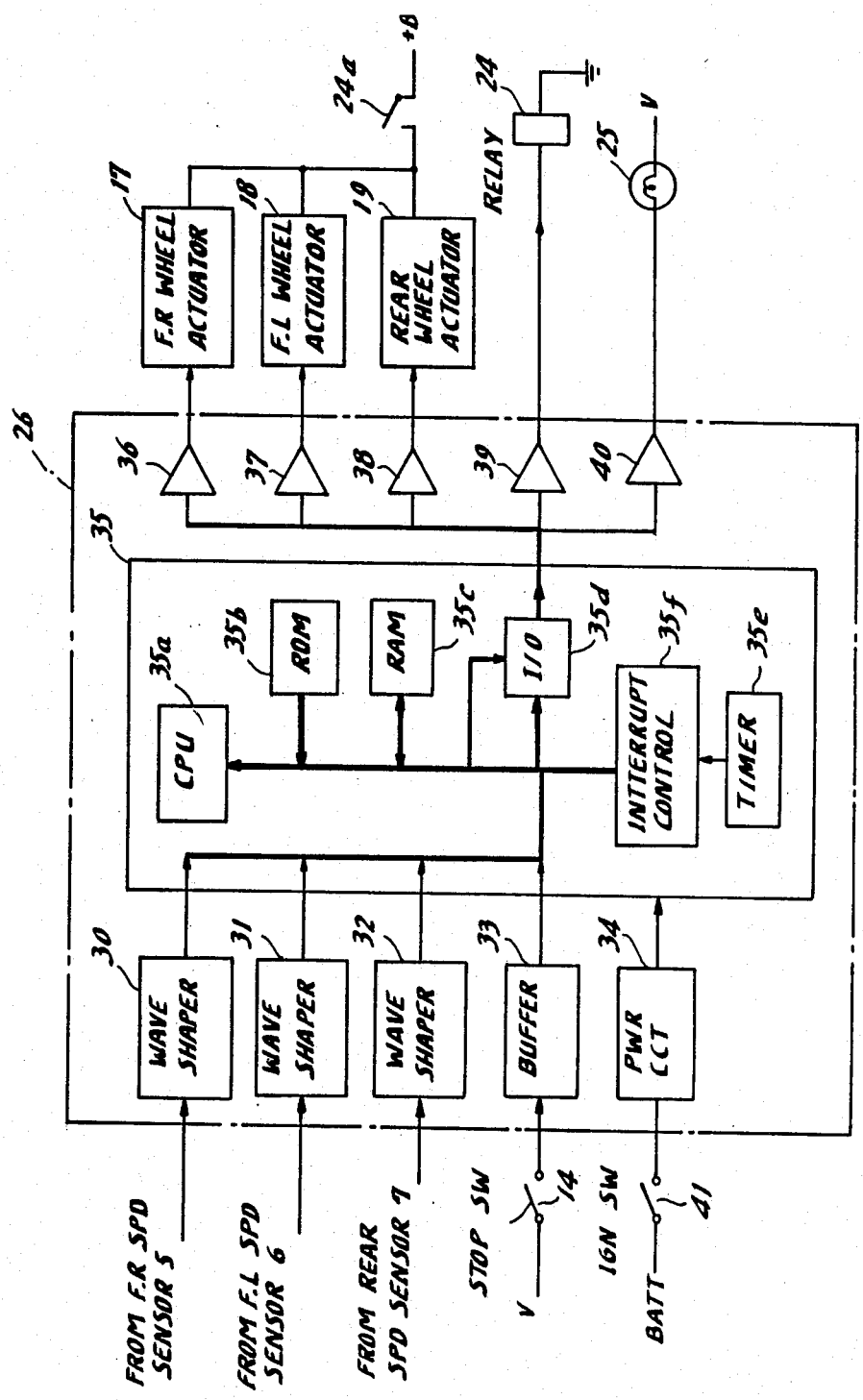
FIG. 4 is an illustration of the detail of the control unit of FIG. 2.

FIG. 4 is an illustration of the detail of control unit 26. Wheel speed signals from sensos 5, 6, 7 are shaped into rectangular pulses by waveshaping circuits 30, 31, 32 and stop signal from switch 14 is fed to a buffer 33. Microcomputer 35, which is powered by circuit 34 in response to ignition switch 41, includes a microprocessor (CPU) 35a that receives these signals through an input/output port 35d to perform operations according to programmed instructions stored in read-only memory 35b. Temporary data are stored in RAM 35c during the process of input data which will be described in detal later. Brake control signals from microcomputer 35 are fed through drivers 36, 37, 38 to solenoid-operated actuators 17, 18, 19, respectively, which are connected in circuit with the relay contacts 24a of cut-off relay 24 which is energized by a driver 39. Driver 40 energizes warning light 25 under control of microcomputer 35. A timer 35e provides a timing pulse at regular intervals to an interrupt control unit 35f which in response to the timing pulse issues an interrupt command to microprocessor 35a. As will be described later, the microprocessor interrupts its main routine execution to execute a timer interrupt subroutine in which it selects an appropriate brake pressure gradient pattern and operates the actuators 17-19.

When ignition switch 41 is turned on, microcomputer 35 initiates executing instructions stored in ROM 35b. Program shown in FIG. 5 starts with a block 101 where various temporary data such as flags are initialized. Control is passed to a subroutine 102 in which antiskid control go-ahead decision and start timing decision are made. As shown in FIG. 6, subroutine 102 comprises three successive steps 1021 to 1023 for making decisions by proceeding with a block 1021 in which the microcomputer checks if the antiskid system is functioning properly. In block 1022, vehicle speed Vsb is compared with a reference speed (5 km/h, for example) to detect if the vehicle is higher than the reference, and in block 1023 the ON-state of stop switch 14 is detected. If these decisions are all affirmative, control is passed to a block 1024 to set go-ahead flag $F_{act}$ and if any one of these decisions is negative control is passed to blocks 1025 and 1028 in succession to reset go-ahead flag $F_{act}$ and control start flag $F_{sta}$, respectively. Block 1026 is then executed to detect if any one of sensed wheel speed values Vw is lower than a reference speed Vss which represents the upper limit for effecting antiskid control. Control is passed to block 1027 to set control start flag $F_{sta}$ if the speed value Vw becomes lower than reference speed Vss.

Figure 7A:
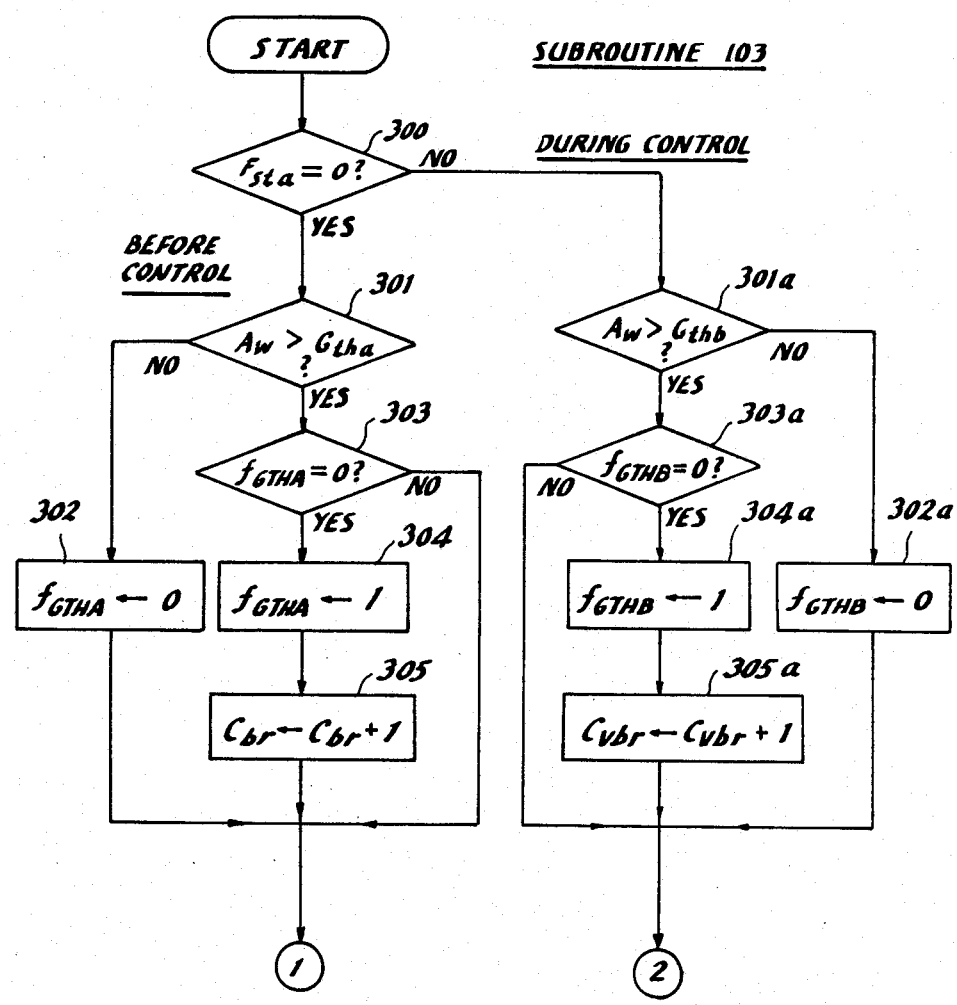
FIGS. 7a–7c are illustrations of a flow diagram describing surface conditions determination subroutine of FIG. 5.
Figure 7B:
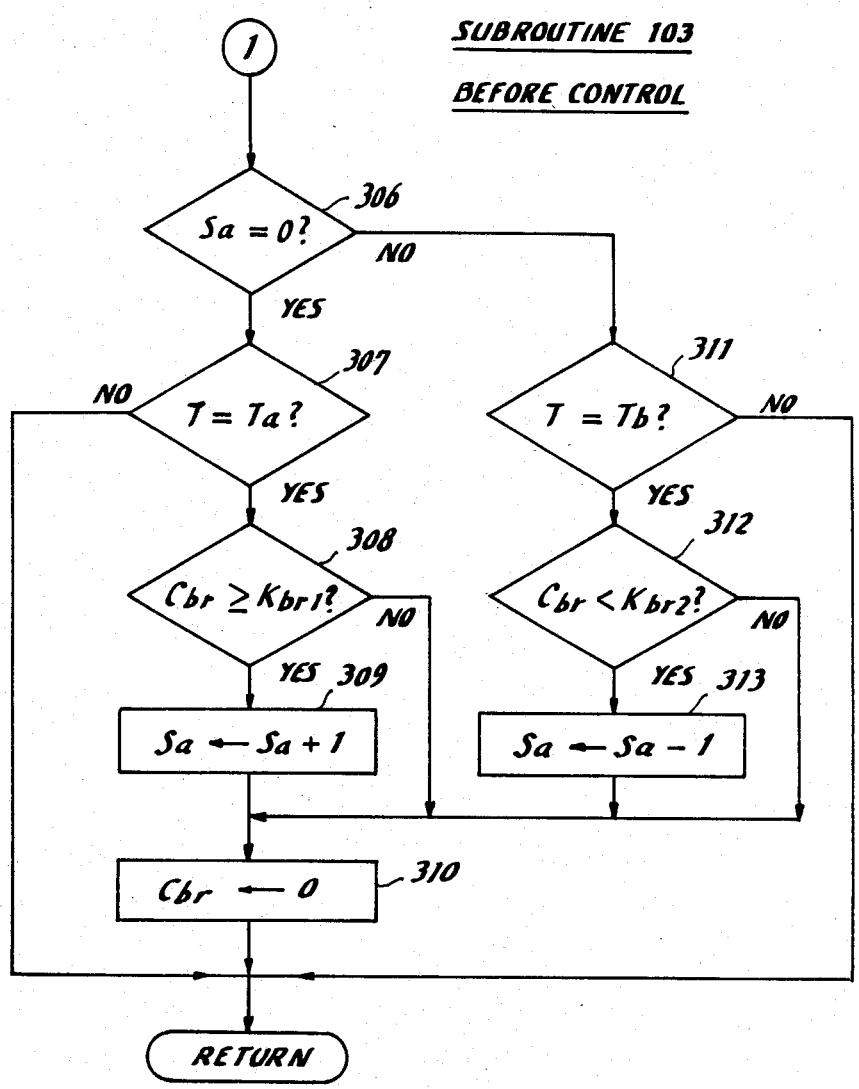
Figure 7C:
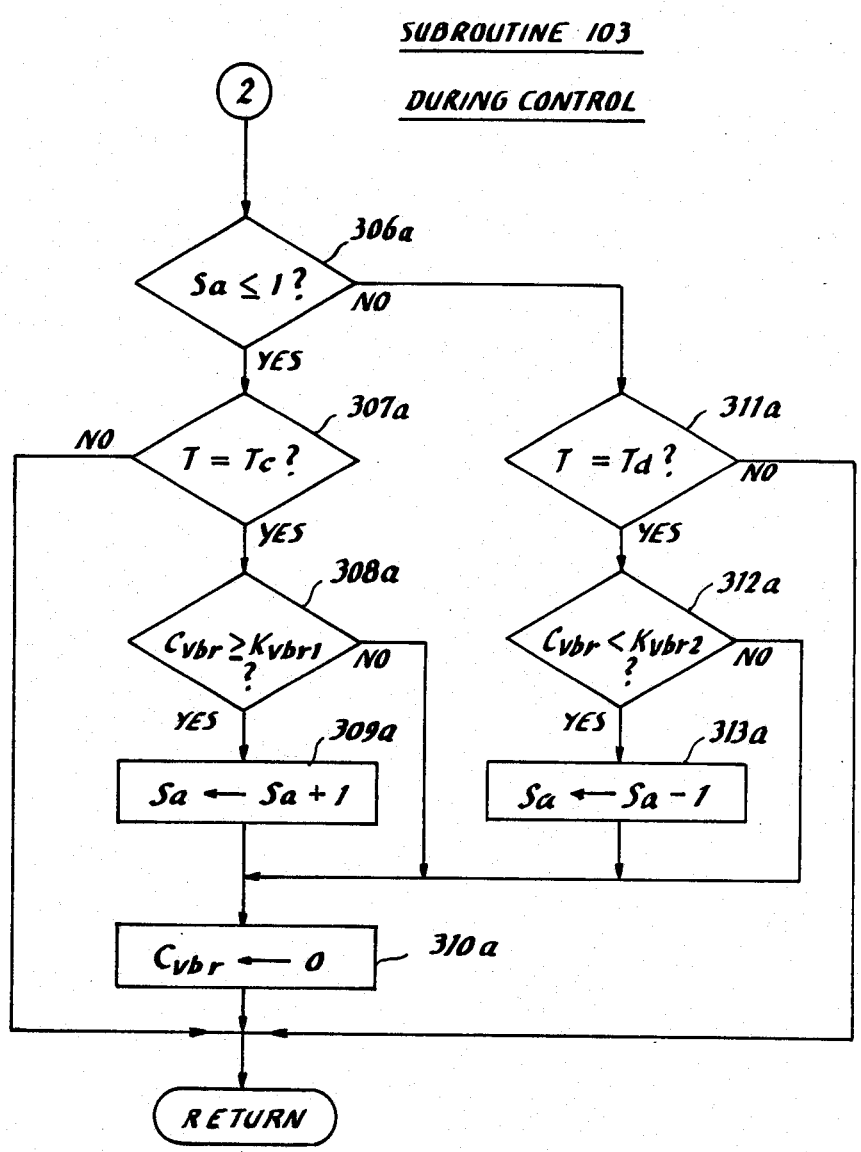

The microcomputer then advances to a subroutine 103 to estimate road surface conditions including types of road, road friction and surface irregularities. FIGS. 7a to 7c illustrate the steps necessary to obtain such information before and during antiskid control using data representing reference wheel speed and wheel acceleration stored in ROM 35b. In FIG. 7a, the subroutine 103 starts with a decision step 300 in which the microprocessor determines if the system is before or during antiskid control by checking start flag $F_{sta}$. If $F_{sta}=0$, indicating that antiskid control is not yet started, control is passed to block 301 to check if the actual acceleration Aw of each wheel is greater than the reference value of wheel acceleration $G_{tha}$ (which is typically +2.0 g) and if not, acceleration exceedance flag $fG_{THA}$ is reset in block 302 and if so, control is passed to block 303 to check if this flag $f_{GTHA}=0$ indicating that the actual acceleration Aw has just exceeded reference $G_{tha}$ in the current execution. If so, control is passed to blocks 304 and 305 to set up flag $f_{GTHA}$ and increment acceleration exceedance counter Cbr by one.

If antiskid control is being effected, control exits from block 300 to a sequence of blocks 301a to 305a corresponding to blocks 301 to 305. In block 301a actual acceleration value Aw is compared with a reference wheel accleration $G_{thb}$ and if Aw is smaller than $G_{thb}$ (+4 g), acceleration exceedance flag $f_{GTHB}$ is reset in block 302a, and if Aw is greater than $G_{thb}$, control is passed through blocks 303a, 304a and 305a to set up flag $f_{GTHA}$ and increment acceleration exceedance counter Cvbr if the accleration value has just exceeded the reference $G_{thb}$ in the current execution.

If wheel acceleration has reduced below the reference value in either prior to or during control, acceleration exceedance flag $f_{GTHA}$ or $f_{GTHB}$ will be reset. Therefore, the instances of acceleration exceedance are counted by respective counters Cbr and Cvbr.

If antiskid control is not yet effected, block 305 is followed by a sequence of steps shown in FIG. 7b and if antiskid is being effected block 305a is followed by a sequence of steps shown in FIG. 7c.

According to the invention road surface roughness is determined on the basis of four references $Kbr_2$ representing smooth surface, $Kbr_1$ representing a low degree of roughness, and $Kvbr_1$ representing a high degree of roughness, and $Kvbr_2$ representing a surface which falls in a range between smooth and low degree of roughness. Acceleration exceedance count values Cbr and Cvbr are compared with these references during corresponding periods Tb, Ta, Tc and Td.

In FIG. 7b, surface roughness indicator counter Sa is interrogated in block 306. If Sa=0 indicating that the road is smooth, block 307 is executed by detecting when the timer counter T has reached a specified count value representing the period Ta, typically 0.25 seconds, for detecting low degree roughness conditions. If T=Ta, control is passed to block 308 to check if the acceleration exceedance counter Cbr of each wheel has reached a count value equal to or greater than smooth road reference value $Kbr_1$ which represents the low degree of roughness. A suitable value for the reference $Kbr_1$ is 2.

As long as the count Cbr is smaller than low-degree roughness reference $Kbr_1$ during period Ta, the road condition is interpreted as smooth and all wheel acceleration exceedance counters Cbr are reset to zero in block 310. If $Kbr_1$ is exceeded during period Ta, control is passed to block 309 to increment roughness indicator Sa to 1 indicating that a road surface having a low-degree roughness is encountered.

The microprocessor will proceed to block 311 in the next execution to check if the timer counter T has reached a count equal to period Tb, typically one second, for detecting a smooth road condition. At T=Tb, acceleration exceedance counter Cbr is checked in block 312 against smooth surface reference value $Kbr_2$ (=3). If Cbr becomes smaller than $Kbr_2$, roughness indicator counter Sa is decremented to 0 in block 313 to give an indication that the vehicle is running on a smooth surface.

In this way, control is passed to block 307 to check for low degree rough road if smooth road indication was given in the previous execution and control is passed to block 311 to check for smooth road if low degree rough road indication was given in the previous execution.

Figure 8A:
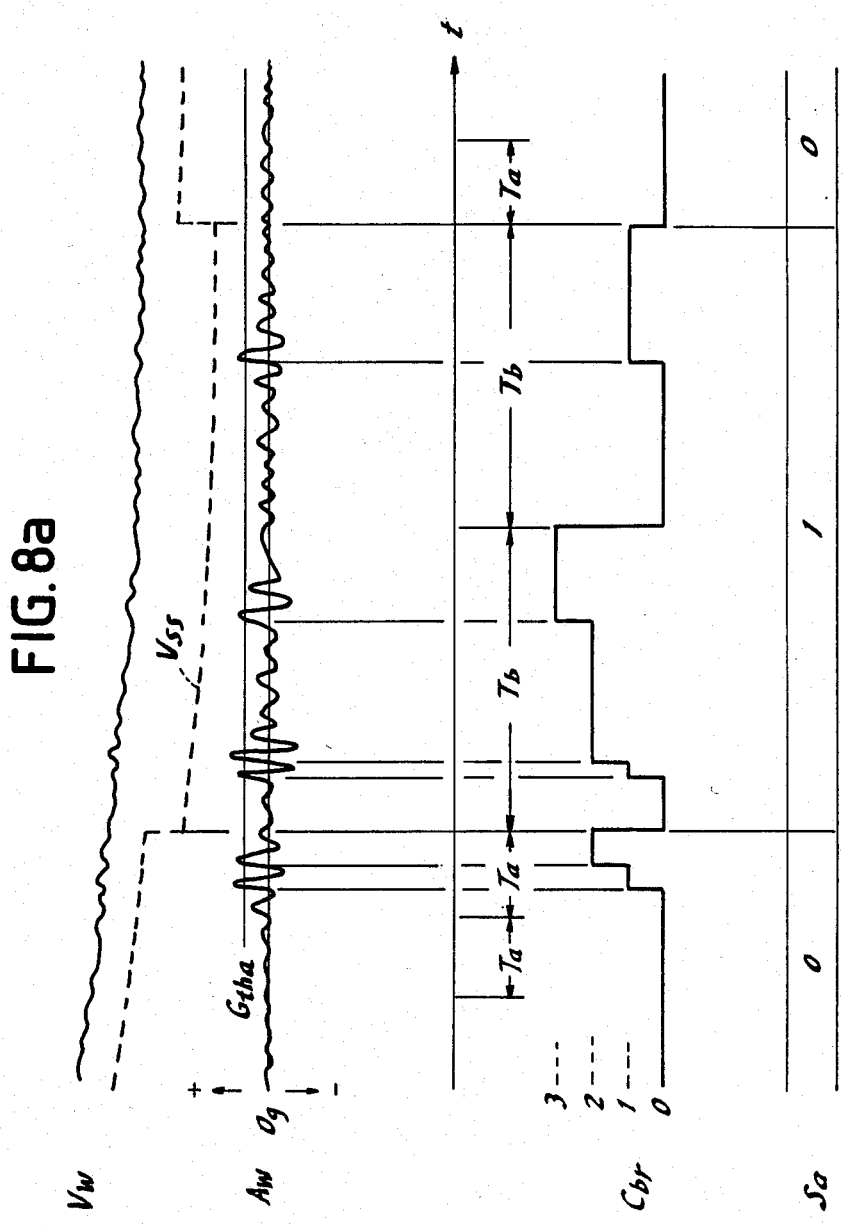
FIGS. 8a and 8a are graphic illustrations useful for describing the operation of the invention.

Let it be assumed that during coasting or pre-antiskid control wheel speed Vw is steadily on the decrease as shown in FIG. 8a and acceleration Aw fluctuates above and below the reference Gtha. The acceleration exceedance count Cbr increases stepwisely from 0 to 2 during period Ta of second occurrence and roughness indicator count Sa is incremented to 1 as the microprocessor executes blocks 307 to 310. With the roughness indicator Sa being switched to 1, decision time period T is switched from Ta to Tb. Upon first occurrence of coincidence between T and Tb, acceleration exceedance counter Cbr is checked against Kbr$_2$ (=3) and control takes "no" decision route from block 312 to block 310. Upon second occurrence of coincidence between T and Tb, Cbr is checked again with Kbr$_2$ and this time the former becomes smaller than the latter and control is passed to block 313 to decrement roughness indicator Sa to 0. Thus, during pre-antiskid control, roughness indicator counter Sa varies between 0 and 1.

The flow diagram shown in FIG. 7c, which is similar to that shown in FIG. 7b, will be executed if start flag F$_{sta}$ is detected in block 300, FIG. 7a. In FIG. 7c, the roughness indicator is interrogated in block 306a. Since the roughness indication stored in counter Sa during a pre-antiskid control period is either 1 (=low-degree roughness) or 0 (=smooth), control is passed to block 307a to check if the timer counter value T has exceeded a threshold corresponding to period Tc (=0.5 seconds). Upon coincidence between T=Tc in block 307a, acceleration exceedance counter Cvbr$_1$ is checked in block 308a against the high degree roughness reference Kvbr$_1$ (=7).

FIG. 8b shows wheel acceleration during antiskid control in which it is compared with high reference Gthb (=+4g). The acceleration exceedance counter Cvbr exceeds Kvbr$_1$ at time T=Tc and roughness indicator counter Sa is incremented to 2 (block 309a), with the Cvbr counter being reset to zero in block 310a.

With Sa being switched to 2 (=high-degree roughness), the microprocessor proceeds to block 311a in the next execution. Count Cvbr is compared with smooth-or-low degree roughness reference Kvbr$_2$ (=8) in block 312a at time T=Td (=1 second). If the latter is exceeded upon the occurrence of first coincidence between T and Td, the Cvbr counter is reset to zero. This counter remains at a level below the reference Kvbr$_2$ upon second coincidence between T and Td, whereupon roughness indicator counter Sa is decremented to 1 in block 313a.

In the next program execution, the microprocessor will proceed to block 307a. In this way, roughness indicator Sa is incremented each time wheel acceleration exceeds reference Kvbr$_1$ (=7) during a 0.5-second period and decremented each time the acceleration reduces below Kvbr$_2$ (=8) during a 1-second period. The roughness indicator counter Sa is utilized to control wheel actuators 17 to 19 in subroutine 105 which will be described with reference to FIG. 10.

Figure 9:
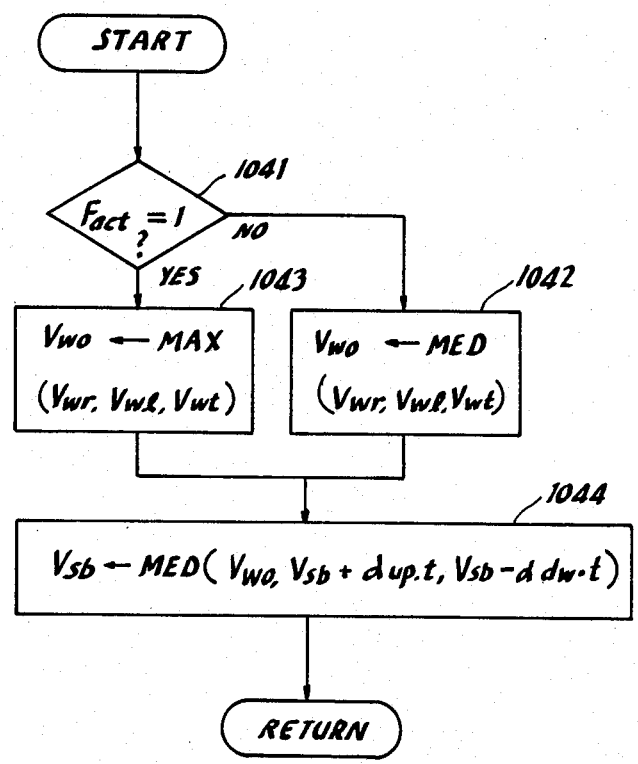
FIG. 9 is a flow diagram describing a vehicle speed determination subroutine of FIG. 5.

Prior to operating the actuators 17–19, vehicle speed Vsb is estimated on the basis of wheel speeds according to a program shown in FIG. 9 which commences with block 1041 which checks whether a go-ahead flag F$_{act}$ has been set up. If F$_{act}$=0, control is passed to block 1042 to derive a reference wheel speed value Vwo from a medium value of front-right, front-left and rear wheel speed values Vwr, Vwl, Vwt. If F$_{act}$=1, control is passed to block 1043 to derive the reference wheel speed Vwo from the maximum of these wheel speeds. In a subsequent block 1044, a previously derived vehicle speed value Vsb is trimmed by the amount of vehicle acceleration or deceleration and a medium value of the reference speed Vwo and the trimmed vehicle speeds is detected as an estimated value of current vehicle speed.

Figure 10:
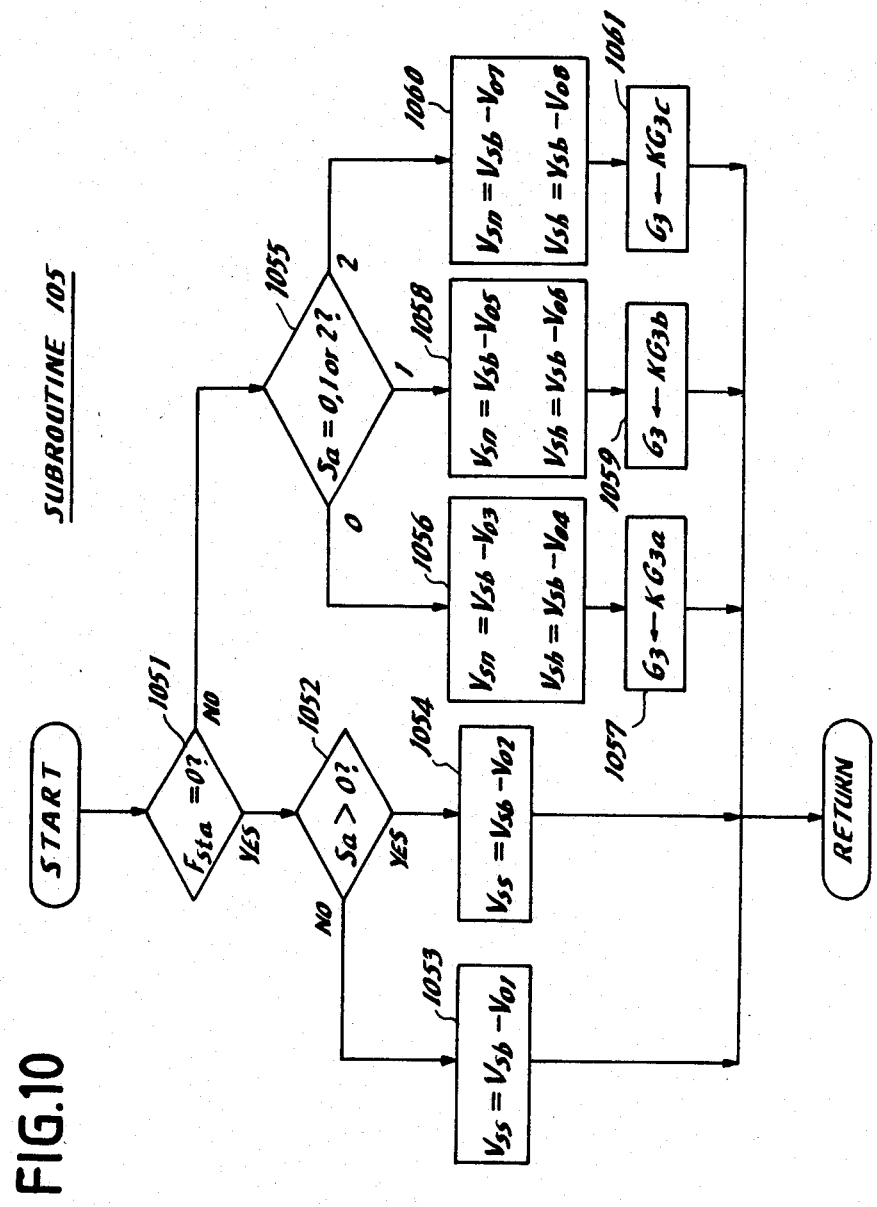
FIG. 10 is a flow diagram describing a reference derivation subroutine of FIG. 5.

The microprocessor now proceeds to block 1051 of subroutine 105, FIG. 10, to check for the status of start flag F$_{sta}$. During pre-antiskid period, control is passed to block 1052 to check if Sa>0. If the road is smooth, Sa=0 and "no" decision route is taken to block 1053 to set pre-control reference wheel speed Vss equal to Vsb-V$_{o1}$, where V$_{o1}$ is typically 5 km/h. If the road is of low degree of roughness, Sa=1 and control is passed to block 1054 to set Vss equal to Vsb-V$_{o2}$, where V$_{o2}$ is typically 10 km/h. Therefore, the pre-control reference wheel speed Vss is decreased when Sa switches from 0 to 1 and vice versa as seen in FIG. 8a. The decrease in reference speed Vss is to prevent premature brake loosening action when light brake is applied on a rough road.

During antiskid control, control is passed to block 1055 to check for the Sa value. If Sa=0, block 1056 is executed by setting a change-to-gradual down pressure threshold Vsn equal to Vsb-V$_{o3}$, where V$_{o3}$ is typically 1 km/h, and setting a change-to-rapid down pressure threshold Vsh equal to Vsb-V$_{o4}$, where V$_{o4}$ is typically 5 km/h. A wheel acceleration reference G$_3$, which will be described later together with G$_1$ and G$_2$, is set equal to KG$_{3a}$ which is typically +7g (block 1057). Likewise, if Sa=1 in block 1055, change-to-gradual down pressure threshold Vsn is set equal to Vsn-V$_{o5}$, where V$_{o5}$ is typically 3 km/h (block 1058), and change-to-rapid down pressure threshold Vsh is set equal to Vsb-V$_{o6}$, where V$_{o6}$ is typically 7 km/h. Wheel acceleration reference G$_3$ is set equal to KG$_{3b}$ which is typically +5g (block 1059). With Sa=2 in block 1055, change-to-gradual down pressure threshold Vsn is set equal to Vsn-V$_{o7}$, where V$_{o7}$ is typically 5 km/h (block 1060), and change-to-rapid down pressure threshold Vsh is set equal to Vsb-V$_{o8}$, where V$_{o8}$ is typically 10 km/h. Wheel acceleration reference G$_3$ is set equal to KG$_{3c}$ which is typically +3 g (block 1061).

Figure 11B:
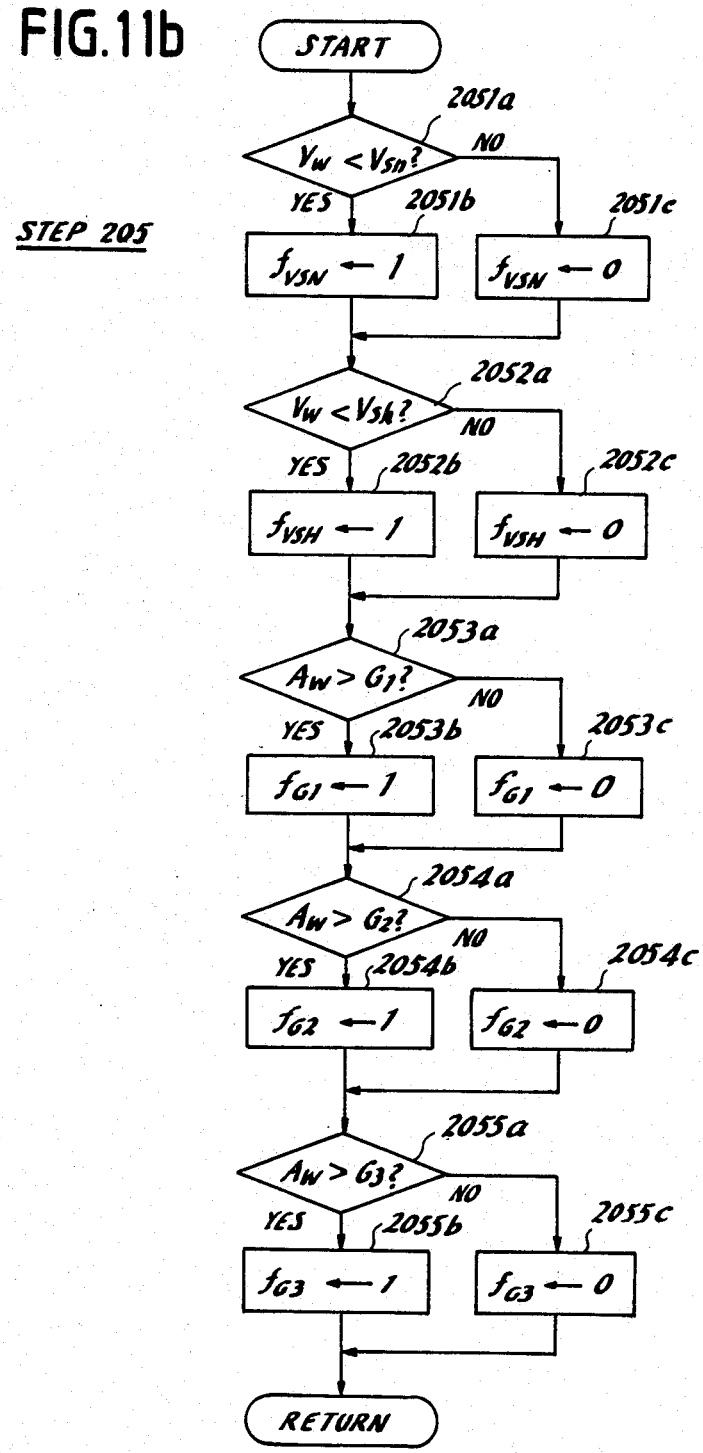

FIGS. 11a and 11b are illustrations of timer interrupt subroutine which is executed at regular intervals during program execution of the main routine. The interrupt routine starts with block 201 in which wheel speed Vw is determined for each of the wheels based on data derived in a wheel speed interrupt routine shown in FIG. 12 by which the main routine is also interrupted in response to the occurrrence of each wheel speed pulse. More specifically, three wheel speed interrupt programs are provided having different priorities to count simultaneously occurring wheel speed pulses at different timing and store the count values in addressible locations of the RAM. In block 201, the counted wheel speed pulses are read from the RAM to detect the difference between the wheel speed count of the previous execution and that derived in the current execution to derive a wheel speed digital value. Wheel acceleration Aw is derived in block 202 by taking a difference between wheel speed values successively derived from each wheel. In blocks 201 and 202 digital filtering techniques may be employed to smooth, out insignificant fluctuations.

Control is now passed to block 203. If go-ahead decision is not present, control is jumped to block 204 to deenergize actuators 17–19 so that they return to inoperative state immediately following the go-ahead flag F$_{act}$ being reset. If F$_{act}$=1 in block 203, control is passed to block 205 to compare wheel speed and acceleration values Vw, Aw with reference values Vsn, Vsh, G$_1$, G$_2$ and G$_3$.

FIG. 11b illustrates the detail of block 205. In block 2051a, each wheel speed value Vw derived in step 201 is compared with change-to-gradual down pressure threshold Vsn. If Vw<Vsn, a change-to-gradual down pressure flag $f_{VSN}$ is set up in block 2051b and if Vw≧Vsn, flag $f_{VSN}$ is reset in block 2051c. The wheel speed value Vw is then compared in block 2052a with change-to-rapid down pressure threshold Vsh. If Vw<Vsh, a change-to-rapid down pressure flag $f_{VSH}$ is set up in block 2052b and if not, this flag is reset in block 2052c.

As will be understood later, the change-to-gradual down pressure flag $f_{VSN}$ is one determining factor to initiate a gradual down pressure control on hydraulic brakes and the change-to-rapid down pressure flag $f_{VSH}$ is also one determining factor to initiate a rapid down pressure brake control.

Each acceleration value Aw is compared successively with deceleration reference $G_1$ and acceleration references $G_2$ and $G_3$. Reference $G_1$ represents a deceleration, typically −2 g, reference $G_2$ representing an acceleration in the range between +0.5 g to +1.0 g and reference $G_3$ representing an acceleration +6 g. Condition Aw>$G_1$ in block 2053a causes flag $f_{G1}$ to set up in block 2053b and condition Aw≦$G_1$ resets it in block 2053c. Condition Aw>$G_2$ in block 2054a causes flag $f_{G2}$ to set up in block 2054b and condition Aw≦$G_2$ resets it in block 2054c. Likewise, condition Aw>$G_3$ in block 2055a causes flag $f_{G3}$ to set up in block 2055b and condition Aw≦$G_3$ causes it to be reset in block 2055c.

The flags $f_{VSN}$, $f_{VSH}$, $f_{G1}$, $f_{G2}$ and $f_{G3}$ are used in block 206 to select an operating mode of the pressure gradient control section 28 of each actuator to apply hydraulic pressure to brakes 9-12 with an appropriate gradient. FIG. 13 shows the pressure gradient patterns associated with the operating modes of actuators 17-19 which can be selected according to different combinations of the flags just mentioned. The ROM stores the solenoid operating modes in locations which are addressed as a function of the combination of binary status of these flags.

Control is then advanced to block 207 to check if a down-pressure mode is selected and if so, a down-pressure time counter $C_{dpt}$ is incremented by one in block 208, and if not this counter is reset in block 209.

In block 210, the microprocessor checks if down-pressure time counter $C_{dpt}$ exceeds a preset limit, typically 3 seconds, and if so, the actuators 17-19 are deenergized in block 204 and if not, control is passed to block 211 to detect if the selected mode is an up-pressure mode and if so, an up-pressure time counter $C_{upt}$ is incremented by one in block 212, and if not, this counter is reset in block 213. If the counter $C_{upt}$ indicates a 3-second period (block 214), actuators are deenergized, and if not, they remain energized.

Figure 14:
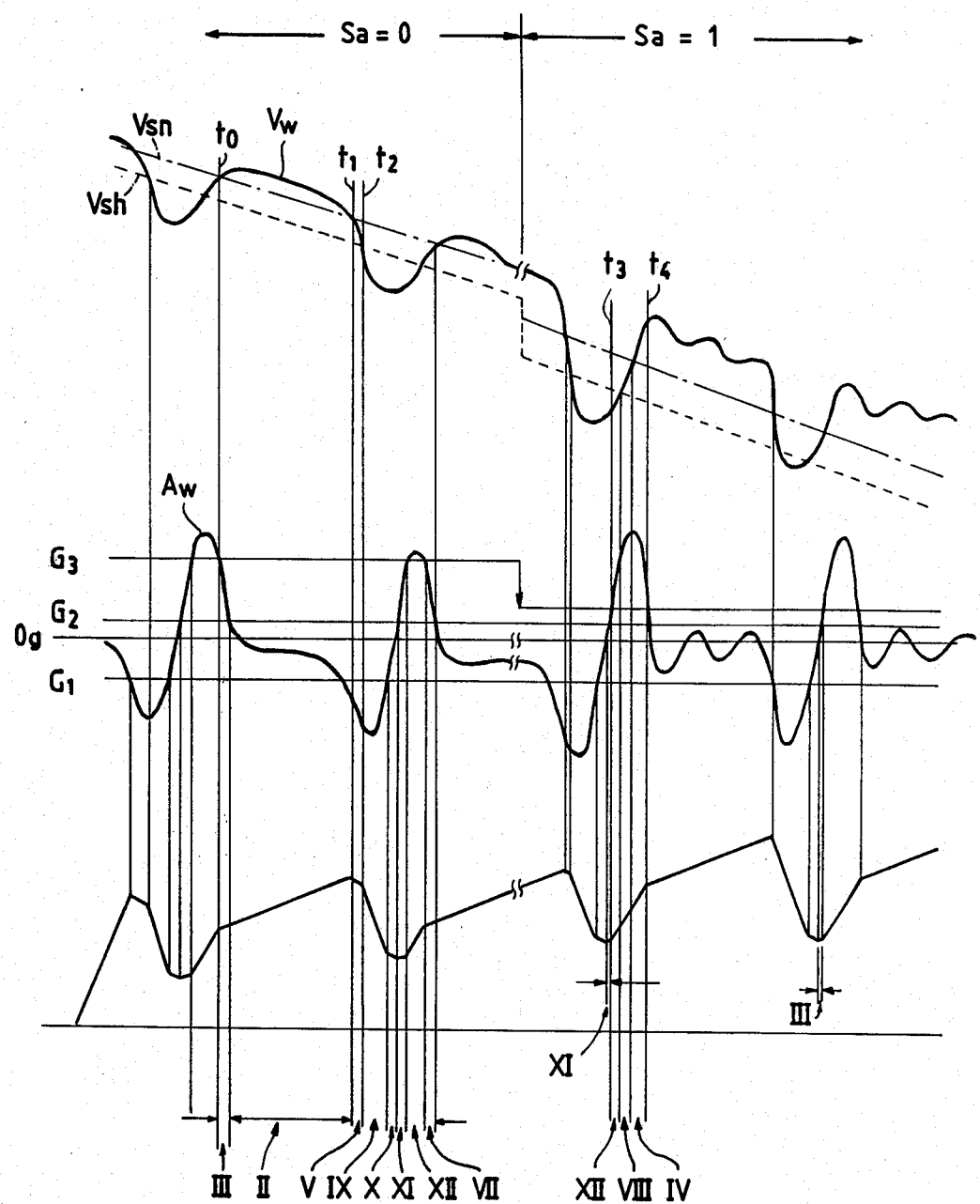
FIG. 14 is a graphic illustration useful for understanding the features of the invention.

The operation of the antiskid control of the invention will be better understood with reference to FIG. 14. Let it be assumed that roughness indicator Sa has changed from 0 to 1, i.e., from a smooth road surface to a low-degree rough road surface during antiskid mode. During the time prior to Sa being switched to 1, wheel acceleration Aw is compared with a higher value of reference $G_3$ which is set equal to KG3a (= +7 g) and wheel speed value Vw is compared with higher values of change-to-gradual down pressure threshold Vsn (=Vsb−1 km/h) and change-to-rapid down pressure threshold Vsh (=Vsb−5 km/h).

During the interval between times $t_0$ and $t_1$ in which Vw is greater than Vsn and Aw is initially greater than $G_2$ and then reduces to a level between $G_2$ and $G_1$, mode III is initially selected in response to flags $f_{G2}=1$ and $f_{G1}=1$ and then mode II is selected in response to flag $f_{G1}=1$, so that brake pressure is on a gradual increase as seen in FIG. 13. At time $t_1$, Vw reduces below Vsn with Aw being lower than $G_1$, flag $f_{VSN}=1$ is established and mode V is selected to gradually decrease the brake pressure. When Vw reduces below Vsh at point $t_2$, flags $f_{VSN}=1$ and $f_{VSH}=1$ are established and mode IX is selected to rapidly decrease the brake pressure. Brake pressure is then switched to gradual down pressure mode X and gradual up pressure mode XI as Aw exceeds $G_1$ and $G_2$ in succession. Rapid up pressure mode XII is selected when Aw exceeds $G_3$ briefly, which is followed by mode VII by which brake pressure is gradually increased.

With the Sa value being switched to 1, reference $G_3$ is switched to a lower value $KG_{3b}$ (= +5 g) and references Vsn and Vsh are also switched to lower values Sb−3 km/h and Sb−7 km/h, respectively. The reduction of references Vsn and Vsh causes the antiskid system to respond with a reduced sensisitivity to rapidly varying wheel speeds. This serves to minimize the undesirable operation of actuators 17-19 resulting from vehicle vibration (known as "surface noise"). The reduction of reference $G_3$, on the other hand, causes the system to respond with an increased sensitivity to rapidly varying acceleration by decreasing the period of gradual up pressure modes XI and III and increasing the period of rapid pressure rise between times $t_3$ and $t_4$ as effected under modes XII, VIII and IV. It is seen therefore that the antiskid system as taught by the present invention ensures against excessive brake pressure reduction which would otherwise occur due to random fluctuation of wheel speeds when the vehicle encounters a rough surface road.

Returning to FIG. 5, subroutine 105 is followed by a system check subroutine 106 in which the microprocessor checks system functions for abnormal conditions. As shown in FIG. 15, the subroutine 106 comprises blocks 1061 to 1066. In block 1061, wheel speed sensors 5-7 are checked for abnormality such as disconnection and short-circuit condition. The source voltage of power circuit is checked in block 1062 for under- or over-voltage condition. Actuator solenoids are checked in block 1063 for disconnection and short-circuit and the down pressure operation is checked in block 1064 for abnormal prolongation. If all these functions are normal, control is passed to block 1065 to reset an abnormal flag $F_{abn}$, and if any abnormality is detected, abnormal flag $F_{abn}$ is set up in block 1066.

Figure 5:
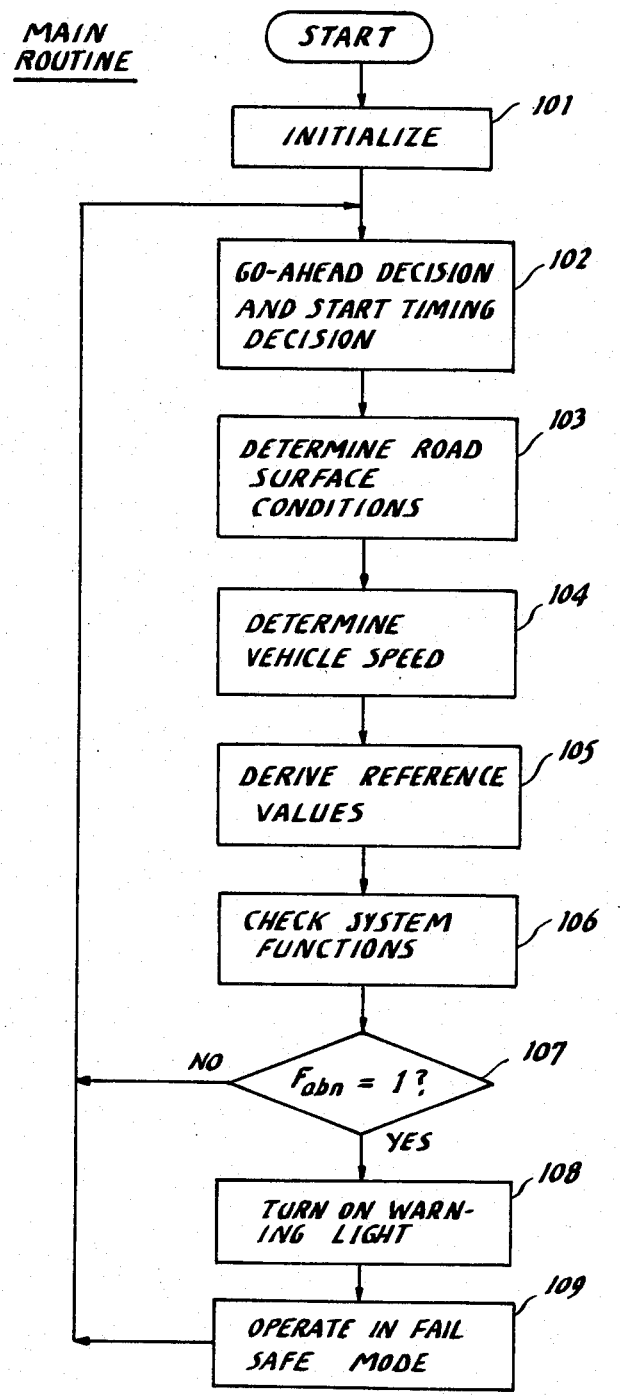
FIG. 5 is an illustration of a flow diagram describing a main routine executed by the microprocessor of FIG. 4.
Figure 6:
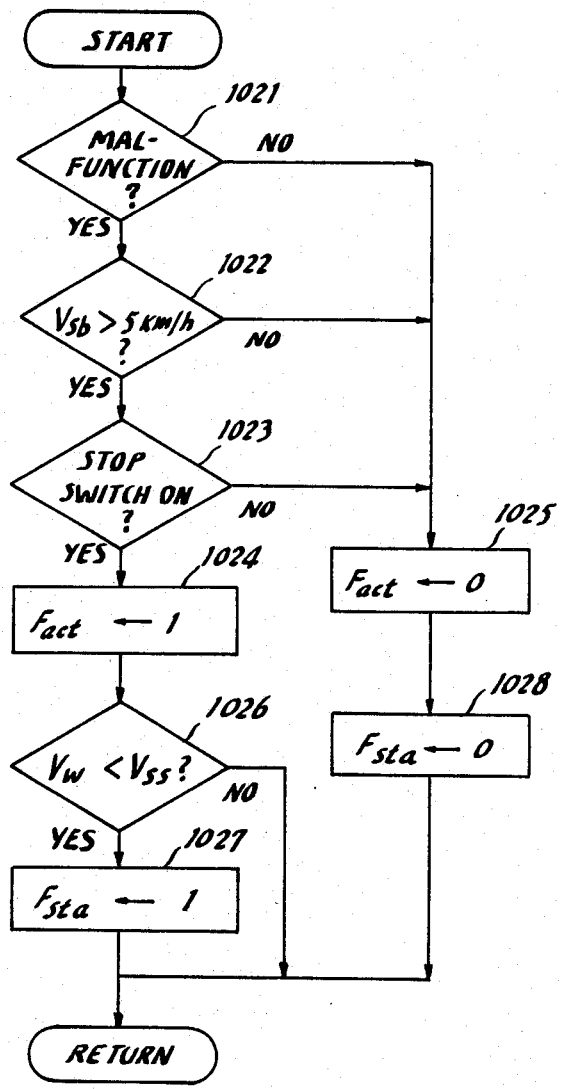
FIG. 6 is a flow diagram of the go-ahead and start timing decision subroutine of FIG. 5.

The microprocessor now proceeds to a step 107, FIG. 5, to check the status of abnormal flag $F_{abn}$. If $F_{abn}=0$, indicating that no abnormality is detected, control is jumped to subroutine 102 to repeat the executions described above, and if $F_{abn}=1$, control is passed to a subroutine 108. A control signal is applied to indicator driver 40 which latches it and drives the warning light 25 to alert the vehicle occupant.

A fail-safe subroutine 109 is executed by energizing the cut-off relay 24 to cut off the circuits to the actuators 17-19. Thus, the system is allowed to operate in a manual mode in which the brake pressure is applied in response to the depression of brake pedal in the usual manner. It is preferable that an arrangement be made to cut off the input circuits to actuator drivers 36-38 to ensure against the abnormality of cut-off relay 24.

What is claimed is:

1. An antiskid control system for a wheel of a wheeled vehicle having a hydraulic brake system, comprising:
   (a) wheel speed detector means for generating a wheel speed signal representative of a rotational speed of said wheel;
   (b) wheel acceleration detector means for deriving a wheel acceleration signal from said wheel speed signal;
   (c) brake control means for controlling a hydraulic pressure of said brake system during one of a variable gradient downhill mode and an uphill mode;
   (d) first comparator means for detecting when said wheel acceleration signal exceeds a predetermined value and producing an output indicative thereof;
   (e) counter means for counting the output of said first comparator means during a first frequency determination period and generating a first count value indicative of a frequency of said wheel acceleration signal; and
   (f) second comparator means, responsive to said first count value from said counter means, for detecting a downhill determination when said first count value exceeds a downhill determination threshold value in order to determine that the vehicle is running on a road having a rough surface, and for causing said brake control means to vary said pressure mode from a high gradient downhill mode to a low gradient downhill mode,
   wherein said counter means is responsive to the determination of said rough road surface and is also for counting the output of said first comparator means during a second frequency determination period longer than said first frequency determination period and a generating a second count value indicative of the frequency of said wheel acceleration signal,
   and wherein said second comparator means is also for detecting when said second count value drops below an uphill determination threshold value and terminating said downhill determination, to thereby cause said brake control means to change to said uphill mode.

2. An antiskid control system as claimed in claim 1, further comprising means, responsive to a start of operation of said brake control means, for increasing said first and second frequency determination periods respectively to become longer periods of time.

3. An antiskid control system as claimed in claim 1, further comprising correction means, responsive to said downhill determination for increasing said downhill determination theshold value to a higher threshold value and decreasing said uphill determination threshold value to a lower threshold value.

4. An antiskid control system for a wheel of a wheeled vehicle having a hydraulic brake system, comprising:
   (a) wheel speed detector means for generating a wheel speed signal representative of a rotational speed of said wheel;
   (b) wheel acceleration detector means for deriving a wheel acceleraton signal from said wheel speed signal;
   (c) brake control means for controlling the hydraulic pressure of said brake system in a variable gradient downhill mode;
   (d) first comparator means for detecting when said wheel acceleration signal exceeds a predetermined value and producing an output indicative thereof;
   (e) first counter means for counting said output of said first comparator means during a first frequency determination period to determine a frequency of said wheel acceleration signal to produce an output indicative thereof;
   (f) second counter means responsive to an operation of said brake system for counting said output of said first comparator means to determine a frequency of said wheel acceleration signal during a second frequency determination period longer than said first frequency determination period; and
   (g) second comparator means for detecting when one of the output of said first counter means exceeds a first reference value and when the output of said second counter means exceeds a second reference value, to determine that the vehicle is running on a rough surface road, and for causing said brake control means to vary said pressure mode from a high gradient downhill mode to a low gradient downhill mode in response thereto.

5. An antiskid control system as claimed in claim 4, further comprising means for increasing said first and second frequency determination periods respectively to longer periods in response to the determination by said second comparator means.

6. An antiskid control system for a wheel of a wheeled vehicle having a hydraulic brake system, comprising:
   (a) wheel speed detector means for generating a wheel speed signal representative of a rotational speed of said wheel;
   (b) wheel acceleration detector means for deriving a wheel acceleration signal from said wheel speed signal;
   (c) brake control means for controlling a hydraulic pressure of said brake system in a variable gradient downhill mode;
   (d) first comparator means for detecting when said wheel acceleration exceeds a predetermined value;
   (e) counter means for counting the output of said first comparator means during a frequency determination period to generate a count value representing a frequency of said wheel acceleration signal; and
   (f) second comparator means for detecting when the output of said counter means exceeds a downhill determination thereshold and causing said brake control means to vary said pressure mode from a high gradient downhill mode to a low gradient downhill mode in response thereto.

7. A method for controlling the hydraulic brake system of a wheeled vehicle, comprising the steps of:
   (a) generating a wheel speed signal representative of the rotational speed of said wheel;
   (b) deriving a wheel acceleration signal from said wheel speed signal;
   (c) comparing said wheel acceleration signal with a predetermined value to produce an output signal when the acceleration signal exceeds the predetermined value;
   (d) counting the output signal generated by said comparing step (c) during a period, to generate a count value representing the frequency of said wheel acceleration signal;

(e) detecting when said count value exceeds a reference value, to determine that the vehicle is running on a road having a rough surface; and (f) reducing a downhill gradient of the hydraulic pressure of said brake system in response to the determination of said detecting step (e).

8. A method as claimed in claim 7, further comprising the steps of:

(g) increasing the period of said counting step to a longer period in response to said detecting step (e);

(h) counting the output signal generated by said comparing step during said longer period to produce a count value; and (i) terminating said determination by said detecting step (e) when the count value of said counting step (h) drops below a preselected value.

9. A method as claimed in claim 7, further comprising the steps of:

(g) increasing the period of the counting step (d) to a longer period in response to the reducing step (f);

(h) counting the output signal generated by the comparing step (c) during said longer period to produce a count value; and (i) reducing a downhill gradient of the hydraulic pressure of said brake system when the count value of the counting step (h) exceeds a second reference value.

* * * * *